March 10, 1970   K. B. OLANDER   3,499,679
GLARE SHIELD ATTACHMENT FOR VEHICLE SUN VISORS
Filed Jan. 17, 1968   2 Sheets-Sheet 1
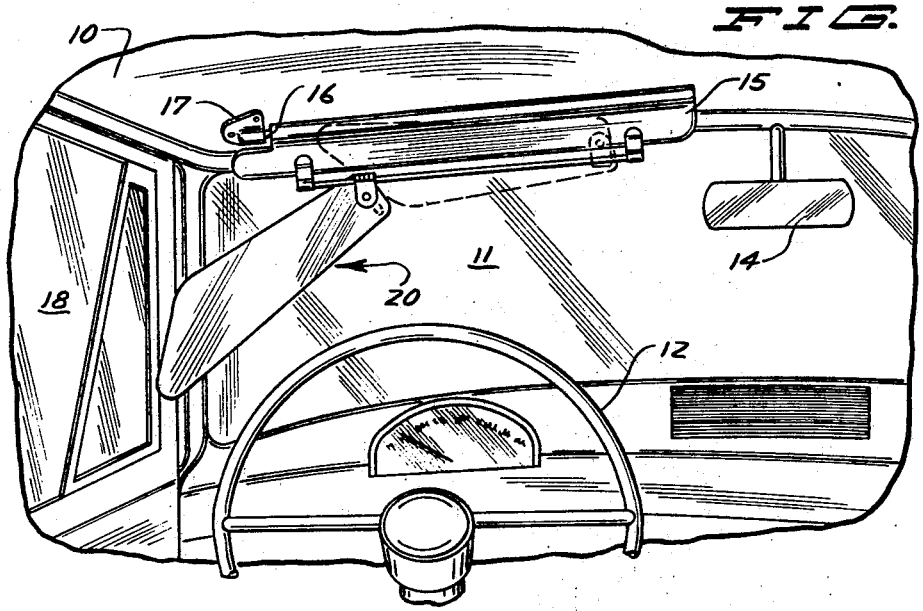
FIG. 1
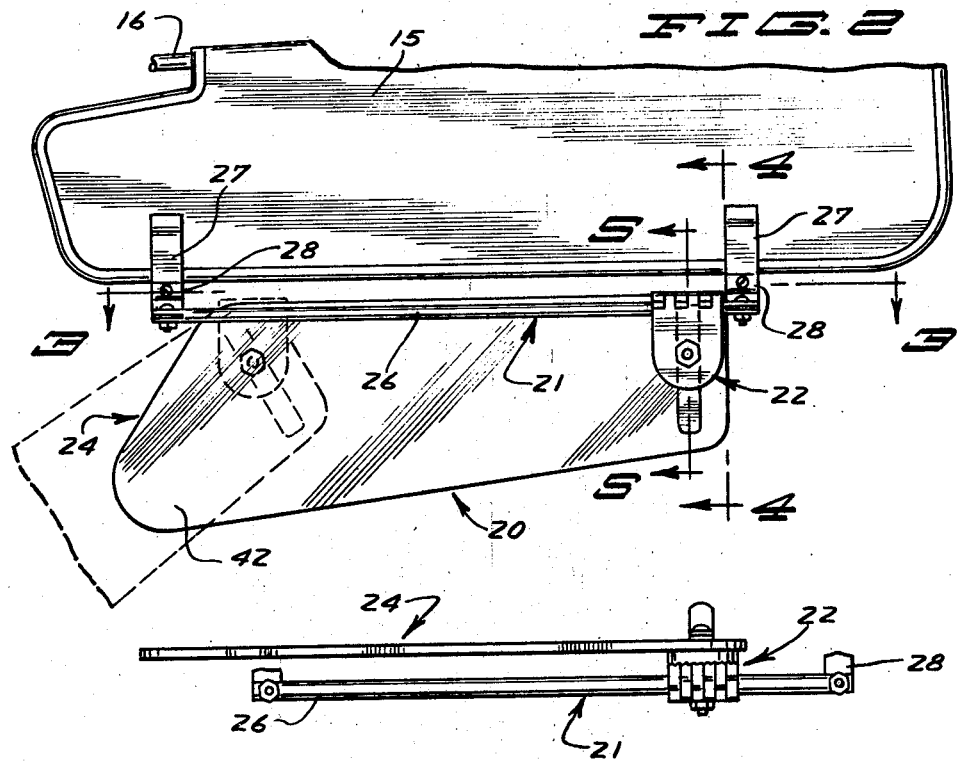
FIG. 2
FIG. 3
INVENTOR.
KEMUEL B. OLANDER
BY
Carlson, Carlson, Sturm & Wicks
ATTORNEYS March 10, 1970  K. B. OLANDER  3,499,679
GLARE SHIELD ATTACHMENT FOR VEHICLE SUN VISORS
Filed Jan. 17, 1968  2 Sheets-Sheet 2
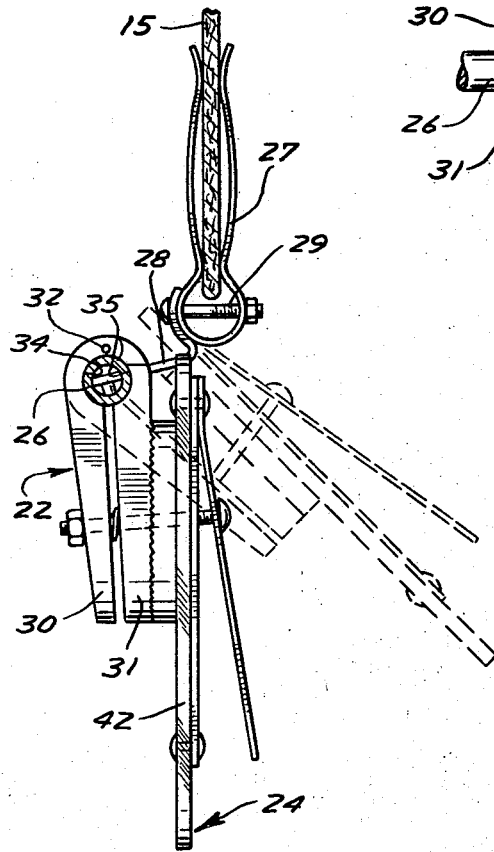
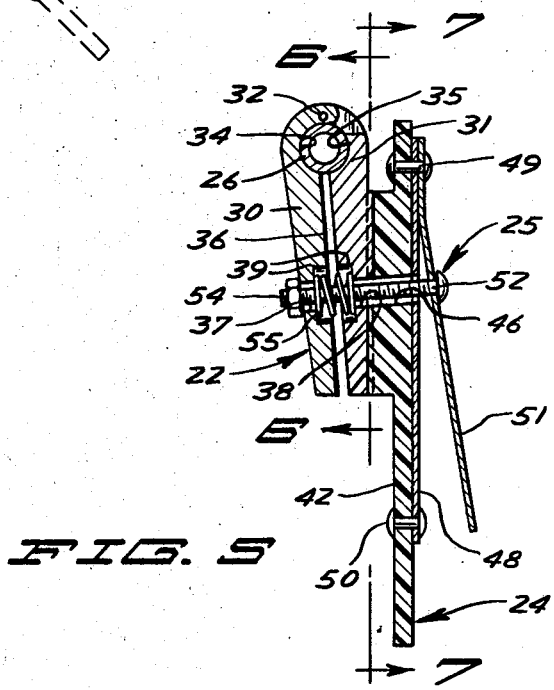
INVENTOR.
KEMUEL B. OLANDER
BY
Carlsen, Carlsen, Sturm & Wicks
ATTORNEYS _United States Patent Office_

3,499,679
Patented Mar. 10, 1970

3,499,679
**GLARE SHIELD ATTACHMENT FOR
VEHICLE SUN VISORS**
Kemuel B. Olander, 301 Parkview Terrace,
Minneapolis, Minn. 55416
Filed Jan. 17, 1968, Ser. No. 698,509
Int. Cl. B60j 3/02
U.S. Cl. 296—97                6 Claims

ABSTRACT OF THE DISCLOSURE

A glare shield for mounting on an automobile windshield visor or the like in front of the driver's position, the mounting allowing movement of the shield in three different planes so as to be brought to any desired position of adjustment and wherein the locking mechanisms for restricting movement of the glare shield on any of said planes are controlled by a single manual control.

---

This invention relates generally to glare shields as used in vehicle passenger compartments to shield the rays of the sun, oncoming headlights and the like from the eyes of the driver or front seat passenger. It more particularly concerns such glare shields as are attached to a conventional automobile sun visor and are readily adjustable through various paths of movement to the desired position.

Virtually all automotive vehicles of present day manufacture are provided, at least in front of the driver's position, with a sun visor which can be adjusted about a transverse horizontal axis between a lowered position and a raised or stored position. Frequently such visors are also pivoted near one end to the vehicle roof for swinging movement about a vertical axis. While such a visor is generally adequate for shielding the driver's eyes from the sun in relatively high positions, it cannot be adjusted to block or diffuse rays from the sun or oncoming headlights entering through the lower area of the vehicle windshield, nor would it be practical nor safe to do so since automobile visors are commonly not translucent or transparent and such adjustment would dangerously block the driver's field of vision.

It is an object of the present invention to provide a glare shield of the proper tinting to effectively modify the blinding glare but which still allows visibility in the field of vision inscribed by the glare shield and having means for attachment to a vehicle sun visor which can be readily adjusted to cover virtually any selected area between the user's eyes and the vehicle windshield.

Another and more specific object of the invention is to provide a glare shield which can be adjusted along three different pathways and locked at any selected position on each with a single control for unlocking the shield for movement along all pathways.

The above and additional objects of the invention will be brought to light during the course of the following specification, reference being made to the accompanying drawings, in which:

FIG. 1 is a perspective view looking forwardly toward the windshield of an automobile and showing the glare shield mounted on the driver's windshield visor and depending therefrom in a position to shield the glare of oncoming headlights. The storage position of the shield is shown in broken lines.

FIG. 2 is an elevation view of the visor mounted shield with one position shown in full lines and another in broken lines.

FIG. 3 is a horizontal section taken on line 3—3 of FIG. 2 and looking downwardly.

FIG. 4 is a vertical section taken on line 4—4 of FIG. 2 and showing the shield in end elevation. An alternate position of the shield is shown in broken lines.

FIG. 5 is a section taken on line 5—5 of FIG. 2 through the glare shield pivot.

FIGS. 6 and 7 are sections taken on line 6—6 and 7—7 of FIG. 5 and looking in opposite directions.

Referring now more particularly to the drawings reference characters will be used to denote like parts or structural features in the different views. In FIG. 1 there is shown the forward portion of a conventional automobile or truck driver's compartment with a roof 10, a windshield 11, steering wheel 12, and rear view mirror 14. The numeral 15 denotes a sun visor mounted on a rod 16 which has one end supported by bracket 17 attached to the roof 10. It will be understood that the visor 15 is adjustable about the axis of rod 16 between forwardly and rearwardly extending positions and various positions of adjustment depending downwardly from rod 16. Also rod 16 may be swingable in bracket 17 for movement of the visor 15 toward the side window 18 of the driver's compartment. This is all conventional vehicle sun visor construction.

The glare shield denoted generally at 20 is made up of four major components, namely, a mounting bar 21, a clamp bracket 22, the shield itself 24, and a control mechanism 25. The mounting bar 21 consists of a straight length metal rod or tube 26 having its ends connected to aligned spring clips 27 as by L-shaped offset members 28 so that the rod 26 is offset from the plane of visor 15 when the clips are attached thereto, as best seen in FIG. 4. Screw and nut assemblies 29 connect members 28 to the bight portions of the clips 27 so that the compressive gripping force of the clips might be adjusted.

The clamp bracket 22 comprises a pair of hinge plates 30 and 31 interconnected near their upper edges by a hinge pin 32 for relative opening and closing movement. Immediately below the hinge pin, as the bracket is viewed in FIGS. 4 and 5, plates 30 and 31 are respectively provided with complementary recesses 34 and 35 which jointly receive rod 26. It will be observed that the plates 30 and 31 do not meet below the rod 26, thus providing the space at 36 allowing selective tightening or releasing of the clamping action of the plates on the rod.

The bottom edges of the hinge plates 30 and 31 are rounded on a common axis (FIG. 6) and the plates are respectively provided with apertures 37 and 38 on said axis, with the adjacent ends of said apertures being enlarged as at 39. The outer or front face of plate 31 is formed with multiple serrations extending radially from the aperture 38 to form a face 40 for a friction clutch which will shortly be more fully explained.

The glare shield 24 is preferably a molded sheet 42 of transparent material which is tinted to screen or diffuse bright light rays. Near one end of sheet 42 a disk 44 is molded therein having a diameter equal to face 40 and the outer face 45 of disk 44 is provided with multiple radial serrations extending from an aperture 46 in sheet 42 and adapted to mate and rotationally interlock with the face 40.

The control mechanism 25 includes a mounting strip 48 riveted to the sheet 42 as at 49 and 50 and a fixed plate spring 51 also secured at 49 and diverging from strip 48. Spring 51 is held in a stressed position by a bolt 52 which extends through apertures in the spring and strip 48 as well as apertures 46, 38, and 37 and held by nut 54. A spiral spring 55 encircles the bolt 52 between the seats 39 to yieldably urge hinge plates 30 and 31 in a separating direction. Spring 51 thus serves as a control device for unlocking the shield 24 to selectively move it between various positions.

It will be understood that the glare shield may be used to supplement the shielding effect of the visor 15 or may be used with the visor 15 in raised position. In either event the rod 26 will be disposed in substantially horizontal position being secured by clips 27 to extend along one longitudinal edge of the visor.

The shield is movable along three different pathways relative to its mounting bar 21 and visor 15. First it can be moved along rod 26 by sliding the clamp 22 therealong (FIG. 2). Secondly, it can be rotated about the axis of the rod, again with clamp 22 moving relative to the rod (FIG. 4). Finally, the shield can be moved about the axis of bolt 52 (FIG. 1).

It will also be understood that the single control mechanism 25 will lock the shield 24 against movement in any of the above mentioned directions. With the clamp 22 held tightly against rod 26 by the bolt 52 which is spring tensioned by spring 51, the shield cannot be moved along or around the rod. By the same manner bolt 52 holds the shield firmly against hinge plate 31 with the serrated faces 40 and 45 in mesh prohibiting rotary movement of the shield about the axis of bolt 52.

By squeezing the sheet and spring 51 together between the thumb and fingers the shield becomes completely unlocked for movement along any of the three pathways of movement. With the bias of spring 51 removed from bolt 52, the spring 55 will spread the hinge plates 30 and 31 sufficiently to allow movement of the clamp 22 along or around rod 26. This also releases the compressive force holding faces 40 and 45 in firm engagement to allow rotary slippage of these faces and resultant adjustment of the shield 24 about the axis of bolt 52.

Obviously, with possible movement of the shield on three different pathways relative to the rod 26 and with further possible adjustment of visor 15 about two different axes, there are innumerable different positions into which the glare shield may be adjusted. Two positions where the shield is found to be particularly useful are shown in full lines in FIG. 1, to dim the bright lights of oncoming cars and in FIG. 2 to shield a low sun.

Of primary importance is the fact that the driver can quickly and easily adjust the shield to any desired position by merely depressing the control member 51. The tension on control mechanism 25 may be varied by adjustment of the nut 54 on bolt 52.

Having now therefore fully illustrated and described my invention, what I claim to be new and desire to protect by Letters Patent is:

1. In a glare shield for attachment to the sun visor of an automobile,
   (a) a straight rod which is round in cross section,
   (b) means at each end of the rod for removably attaching the rod to a horizontal edge of the visor with the rod disposed on a substantially horizontal plane,
   (c) a bracket mounted on the rod for movement therealong or about the axis of the rod,
   (d) first means releasably locking the bracket on the rod against such movement,
   (e) a glare shield pivoted to the bracket for movement about an axis perpendicular to the rod,
   (f) second means releasably locking the shield against movement about the latter axis,
   (g) a single spring tensioned control means for instantly releasing both of said locking means to allow concurrent movement of the shield on or about the rod axis or the pivot axis.

2. In a glare shield for attachment to the sun visor of an automobile,
   (a) a straight rod which is round in cross section,
   (b) means at each end of the rod for removably attaching the rod to a horizontal edge of the visor with the rod disposed on a substantially horizontal plane,
   (c) a bracket mounted on the rod for movement therealong or about the axis of the rod,
   (d) first means releasably locking the bracket on the rod against such movement,
   (e) a glare shield pivoted to the bracket for movement about an axis perpendicular to the rod,
   (f) second means releasably locking the shield against movement about the latter axis,
   (g) a single control means for releasing both of said locking means to allow concurrent movement of the shield on or about the rod axis or the pivot axis,
   (h) said bracket comprising a pair of clamp halves having complementary recesses for jointly receiving the rod,
   (i) spring means biasing the clamp halves toward each other, and
   (j) said control means adapted to overcome said spring means.

3. The subject matter of claim 2 wherein a second spring means is interposed between the clamp halves to urge them in a separating direction when the control means has been operated to overcome said first mentioned spring means.

4. In a glare shield for attachment to the sun visor of an automobile,
   (a) a straight rod which is round in cross section,
   (b) means at each end of the rod for removably attaching the rod to a horizontal edge of the visor with the rod disposed on a substantially horizontal plane,
   (c) a bracket mounted on the rod for movement therealong or about the axis of the rod,
   (d) first means releasably locking the bracket on the rod against such movement,
   (e) a glare shield pivoted to the bracket for movement about an axis perpendicular to the rod,
   (f) second means releasably locking the shield against movement about the latter axis,
   (g) a single control means for releasing both of said locking means to allow concurrent movement of the shield on or about the rod axis or the pivot axis,
   (h) said second means including interlocking serrations on the glare shield and bracket extending radially from their interpivot, and
   (i) spring means acting upon the bracket and shield to yieldably hold the serrations in interlocking engagement.

5. In a glare shield for mounting in an automobile compartment, an elongated cross-sectionally circular rod adapted to be mounted on a portion of the compartment to extend horizontally in front of the driver's position, a shield, means mounting the shield on the rod for selective movement of the shield in first, second and third separate planes, said mounting means including a bracket slidably journaled on the rod for movement therealong on said first plane and about the axis thereof on said second plane, and also including a pivotal connection between the shield and bracket for movement of the shield about a pivot axis perpendicular to said rod on said third plane, and a control mechanism connecting the bracket and shield for releasably locking the shield against or free it for movement in any of said planes, said control mechanism having a single manual control for releasing the shield for movement in any of said planes, and spring means yieldably retaining the control in shield locking position.

6. The subject matter of claim 5 wherein said bracket comprises a pair of facing clamp halves engaging against opposite sides of the rod, the shield engaging against the outside of one of the clamp halves, a bolt extending through said halves and the shield, said spring means acting between the bolt and shield to yieldably hold said halves and shield together, and said one clamp half and shield having intermeshing teeth projecting radially from the bolt axis to interlock said half and shield against relative rotary movement about said bolt axis.

References Cited

UNITED STATES PATENTS

| | | | |
|---|---|---|---|
| 3,126,191 | 3/1964 | Holden | 248—286 |
| 3,158,396 | 11/1964 | Berger | 296—97 |
| 3,336,073 | 8/1967 | Berger | 296—97 |
| 3,383,132 | 5/1968 | Stamp | 296—97 |

LEO FRIAGLIA, Primary Examiner

JOHN A. PEKAR, Assistant Examiner

U.S. Cl. X.R.

248—286